United States Patent [19]
Johnson et al.

[11] Patent Number: 5,553,289
[45] Date of Patent: Sep. 3, 1996

[54] SYSTEM FOR AUTOMATICALLY ASSIGNING ATTRIBUTES TO OBJECTS OF MULTIMEDIA DISTRIBUTION WHEN THE OBJECTS BEING WITHIN A PREDETERMINED RELATIONSHIP

[75] Inventors: William J. Johnson, Flower Mound; Marvin L. Williams, Lewisville, both of Tex.

[73] Assignee: International Business Machines Corporation, Armonk, N.Y.

[21] Appl. No.: 814,019

[22] Filed: Dec. 26, 1991

[51] Int. Cl.$^6$ .................................................. G06F 15/40
[52] U.S. Cl. ........................ 395/700; 395/154; 395/600; 395/200.15
[58] Field of Search ...................... 364/DIG. 1, DIG. 2; 395/200, 154, 600, 700, 200.01, 200.15

[56] References Cited

U.S. PATENT DOCUMENTS 5,210,868  5/1993  Shimada et al. ..................... 395/600
5,247,661  9/1993  Hager et al. ......................... 395/600

Primary Examiner—Thomas C. Lee
Attorney, Agent, or Firm—Geoffrey A. Mantooth

[57] ABSTRACT

Multimedia distributions (documents, messages, etc.) on a data processing network are automatically assigned specific attributes based on the specific types of media (audio, text, etc.) contained in the distribution. First, specific attributes are associated with specific types of media. Then, the distribution is searched to determine the types of media contained therein. The attributes that are associated with those types of media present in the distribution are assigned to the distribution. The distribution may contain multiple objects. The search for media types can be limited to those objects in the distribution having predetermined relationships.

24 Claims, 4 Drawing Sheets

SYSTEM FOR AUTOMATICALLY ASSIGNING ATTRIBUTES TO OBJECTS OF MULTIMEDIA DISTRIBUTION WHEN THE OBJECTS BEING WITHIN A PREDETERMINED RELATIONSHIP

FIELD OF THE INVENTION

The present invention relates to multimedia distributions in data processing systems, and more particularly to the assignment of attributes to multimedia distributions.

BACKGROUND OF THE INVENTION

Data processing systems used in office environments commonly connect multiple user interfaces together in a network. Users at the user interfaces are able to communicate with each other by way of distributions sent over the network. Distributions include electronic mail, messages, documents, notes, etc.

The distributions can be assigned attributes in order to facilitate their dissemination. For example, one type of attribute is the classification of the sensitivity of the subject matter in a distribution. Values for the classification type of attribute typically include PRIVATE, NONPRIVATE, or CONFIDENTIAL. When a user receives a document classified as PRIVATE, the recipient is likely to read it at a time when no one else can see it. Other examples of types of attributes include the grade of delivery (NORMAL, URGENT, NONURGENT), carbon copy or blind copy recipients, cross references, obsolete references, importance, expiration dates and reply to date. Sometimes, multiple attribute types must be given to a distribution before it can properly be sent.

In the prior art, the assignment of attributes to distributions has been done manually by the user. The prior art method of attribute assignment has proven inadequate in multimedia data processing systems.

This is because in a multimedia system a user can cut, paste and merge a plurality of media into a single document for distribution. Often the characteristics of the content, such as audio, can determine the attribute that should be assigned to a distribution. For example, if a user is composing a document and in the process uses an annotated audio note, then the user's organization may require that the document be classified as PRIVATE. This policy would require the user to analyze the document and to determine if audio content is associated with the document. If the user discovers an audio medium was included in the content of the document, then the user must manually designate the document as PRIVATE.

The task of manually discovering if a particular medium is part of a distribution is further complicated by the use of folders and stapled documents in the distribution, wherein multiple documents can be joined together in the distribution. The problem is compounded further still when the user who is sending the document is not the user who created the document.

Thus, it is very easy for the person who manually assigns media-based attributes to a distribution to miss a specific type of media component and therefore not provide the proper attribute. As a result, errors in assigning attributes to the document occur. Occasionally, these errors can lead to embarrassing situations. For example, a distribution could contain an audio message that requires the distribution to be classified as PRIVATE, but instead is erroneously classified as NONPRIVATE. When the recipient accesses the distribution, thinking it to be unimportant, the private audio message could be publicly heard, much to the chagrin of the recipient. By the time the recipient discovers the error, it may be too late.

SUMMARY OF THE INVENTION

It is an object of the present invention to provide a method and system for automatically assigning attributes to distributions in a multimedia data processing system, based on content type relations.

It is another object of the present invention to provide a method and system for automatically assigning attributes to distributions based on the type of media being used in the distribution.

The present invention automatically assigns attributes to multimedia distributions in a data processing system. Specific attributes are associated with specific types of media. The associated attributes are assigned to respective distributions based upon a determination of the types of media in the respective distributions.

By automatically assigning attributes to a distribution according to the types of media that the distribution contains, attribution schemes of users and organizations are implemented easily and without error.

BRIEF DESCRIPTION OF THE DRAWINGS

FIGS. 2 & 3 show the configuration process for configuring the various parameters for assigning attributes. FIG. 4 shows the invocation process for assigning attributes to distributions.

DESCRIPTION OF PREFERRED EMBODIMENT

Figure 1:
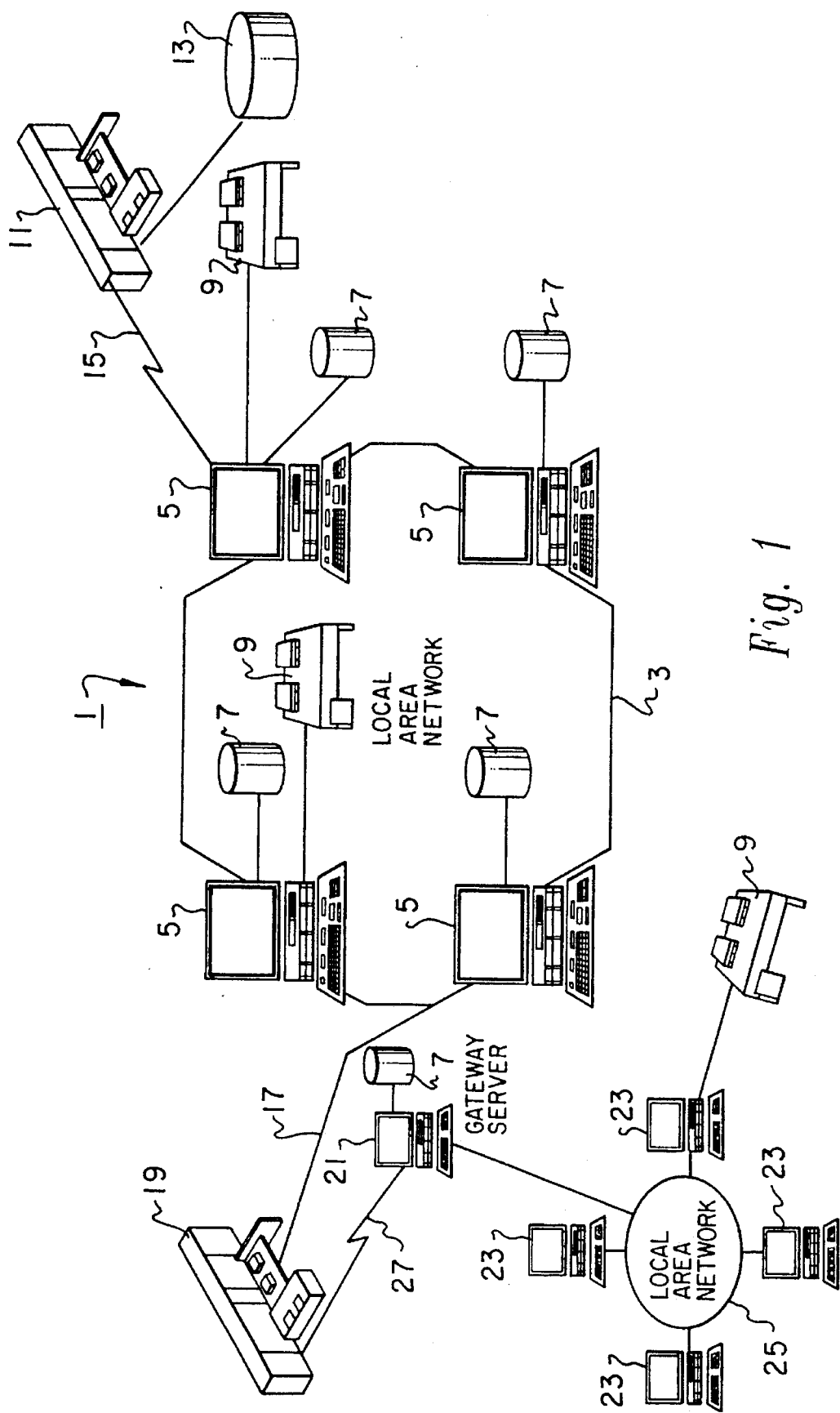
FIG. 1 is a block diagram showing the data processing system of the present invention.

In FIG. 1, there is shown a data processing system 1 which may be utilized to implement the method of the present invention. As may be seen, data processing system 1 may include a plurality of networks, such as Local Area Networks (LAN) 3 and 25, each of which preferably includes a plurality of individual computers 5 and 23, respectively. Of course, those skilled in the art will appreciate that a plurality of Interactive Work Stations (IWS) coupled to a host processor may be utilized for each such network.

As is common in such data processing systems, each individual computer may be coupled to a storage device 7 and/or a printer/output device 9. One or more such storage devices 7 may be utilized, in accordance with the method of the present invention, to store applications or resource objects which may be periodically accessed by an user within data processing system 1. In a manner well known in the prior art, each such application or resource object stored within a storage device 7 is associated with a Resource Manager, which is responsible for maintaining and updating all resource objects associated therewith.

Still referring to FIG. 1, it may be seen that data processing system 1 may also include multiple main frame computers, such as main frame computer 11, which may be preferably coupled to Local Area Network (LAN) 3 by means of communications link 15. Main frame computer 11 may also be coupled to a storage device 13 which may serve as remote storage for Local Area Network 3. Similarly, Local Area Network (LAN) 3 may be coupled via communications link 17 through a subsystem control unit/communications controller 19 and communications line 27 to a gateway server 21. Gateway server 21 is preferably an individual computer or Interactive Work Station (IWS) which serves to link Local Area Network (LAN) 25 to Local Area Network (LAN) 3.

As discussed above with respect to Local Area Network (LAN) 25 and Local Area Network (LAN) 3, resource objects may be stored within storage device 13 and controlled by main frame computer 11, as resource manager for the resource objects thus stored. Of course, those skilled in the art will appreciate that main frame computer 11 may be located a great geographic distance from Local Area Network (LAN) 3 and similarly Local Area Network (LAN) 3 may be located a substantial distance from Local Area Network (LAN) 25. That is, Local Area Network (LAN) 25 may be located in California while Local Area Network (LAN) 3 may be located within Texas and main frame computer 11 may be located in New York.

In known prior art systems of this type, should the user of an individual computer 23, 5 desire to access a resource object stored within storage device 20, associated with main frame computer 11, the resource object may be stored using a communication architecture which allows it to be conveyed from one type of data processing system to another irrespective of data contents.

Figure 2:
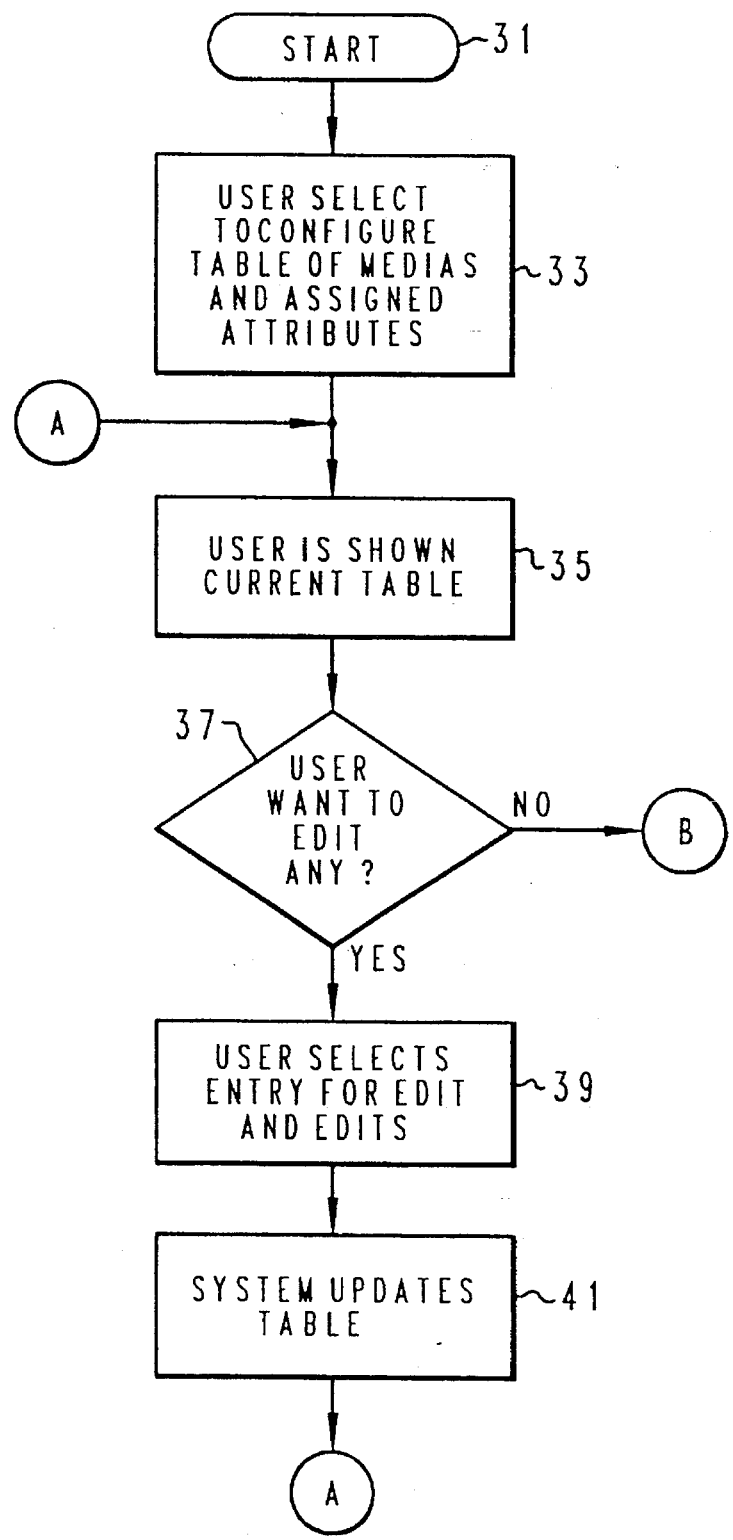
FIGS. 2–4 are flow charts showing the method of the present invention, in accordance with a preferred embodiment.
Figure 3:
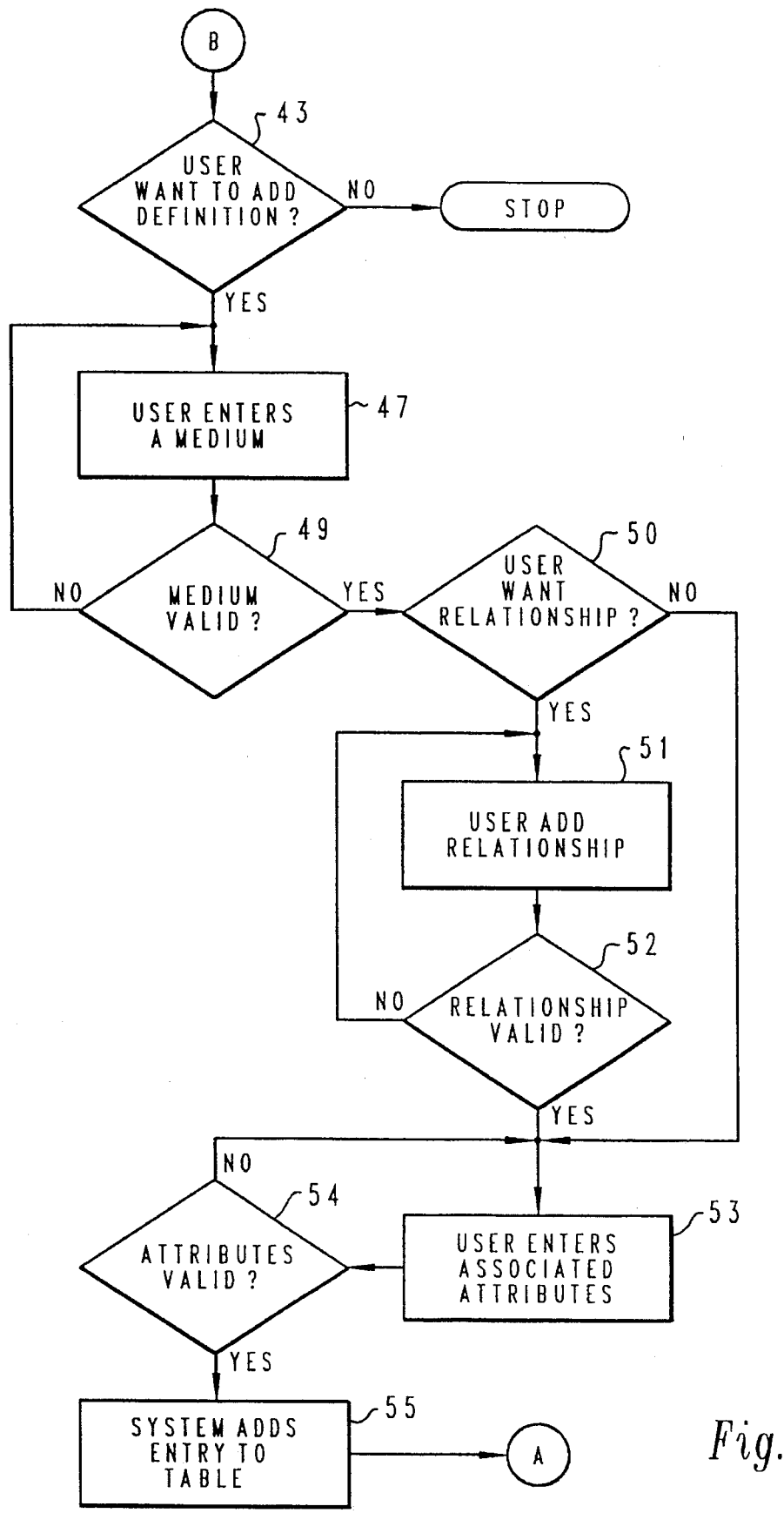
Figure 4:
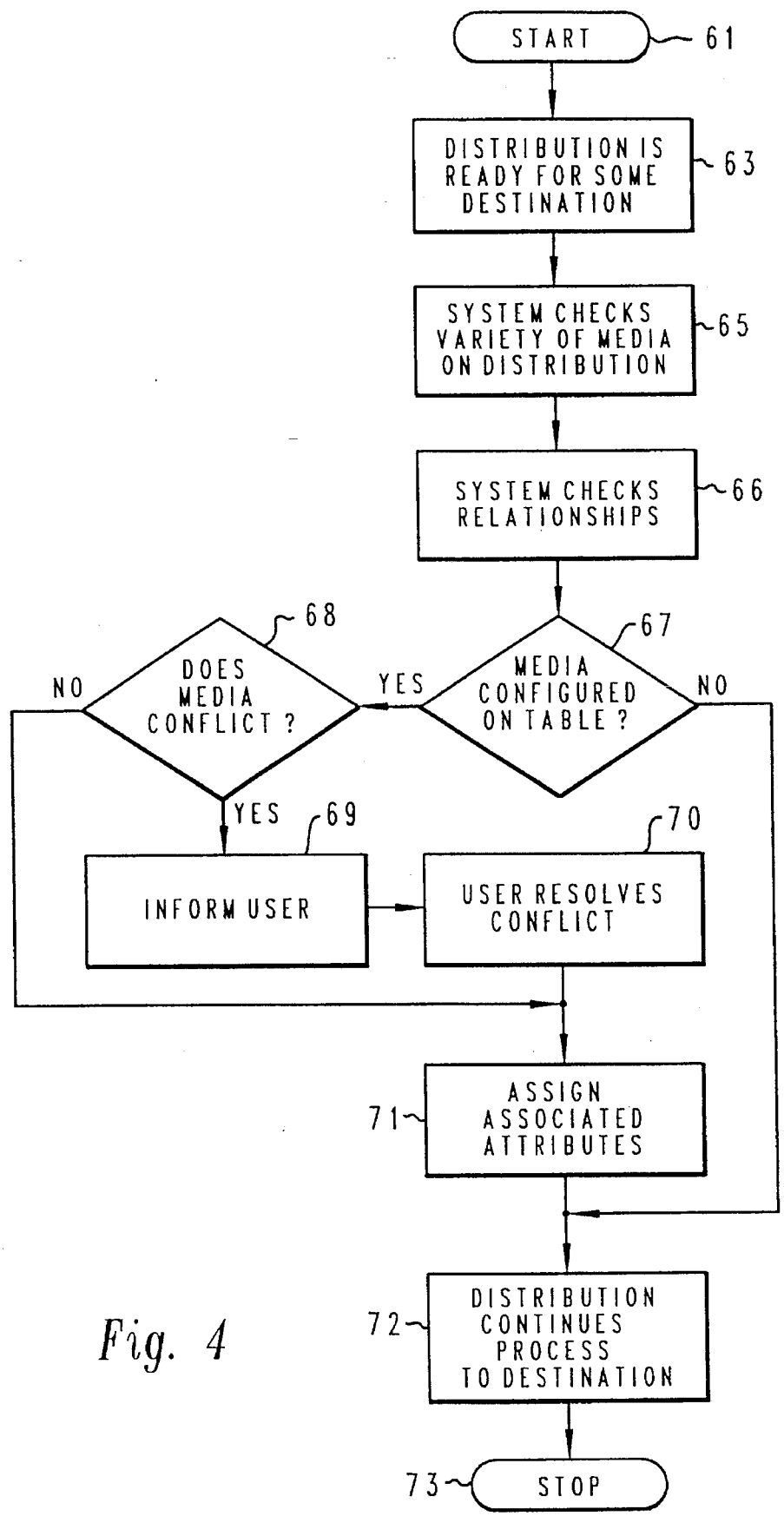

The present invention automatically assigns attributes to a distribution according to the type of media contained in the distribution. First, the configuration process of FIGS. 2 & 3 is used to set up the association parameters. The association parameters associate specific attributes with specific types of media. Then, whenever a distribution is ready for some destination, the invocation process of FIG. 4 is used.

The method of the present invention will now be described with reference to the flow charts of FIGS. 2–4. In the flow charts, the following graphical conventions are observed: a diamond for a test or decision, a rectangle for a process or function and a circle for a connector in exiting to or entering from another part of the flow chart. These conventions are well understood by those skilled in the art, and the flow charts are sufficient to enable one skilled in the art to write code in any suitable computer programming language, such as BASIC, PASCAL or C for a computer such as the IBM Personal System/2 (PS/2) family of computers which supports these languages.

Referring now to FIGS. 2 & 3, the configuration process will be described. The configuration process is started and initialized, step 31. The user, in step 33, selects to configure a table of medias and assigned attributes. This table of medias and attributes is used in the invocation process of FIG. 4 to assign attribute types and values to distributions. In step 35 the user is shown the current table. Then, the user is asked if he wants to edit the current table, step 37. If YES, then the method proceeds to step 39, wherein the user selects the table entry that he wants to edit. The user then edits the entry by changing or deleting the entry. When the editing for the entry is finished, the system then updates the table, step 41. The method then loops back to step 35, where the updated table is displayed.

If the user does not want to edit the table (a NO being produced by step 37), then the method proceeds to step 43, FIG. 3, where the user is asked if he wants to add a definition to the table to define the attribution that is to be associated with a specific media type. If NO, the user does not want to add to the table, then the method stops, step 45, thus completing the configuration process. If YES, the user does want to add a definition, then the method proceeds to step 47, wherein the user enters a particular medium (such as audio, video, text, facsimile image, bit image, or hologram). Next, the medium just entered is checked for validity, step 49. If NO, the medium is not valid, the method loops back to step 47 for another medium to be entered. If YES, then the method proceeds to step 50, where the method determines if the user wants to add a relationship parameter. A distribution may contain multiple objects, such as documents, messages, etc., therein. These objects are related to one another in some manner. With steps 50–52, the user can decide whether to have the present invention search the entire distribution, with all of its objects, or else search some select related objects of the distributions. If the result of step 50 is YES, then the user adds the desired relationship, step 51. Next, the method determines if the relationship is valid, step 52. If YES, the method proceeds to step 53. If NO, the method loops back to step 51. If the result of step 50 is NO, the method proceeds to step 53. In step 53, the user enters the attribute types and values he wants to be associated with the medium. For example, the user can enter the classification PRIVATE for audio media. In step 54, the attribute types and values are checked for validity. If NO, the attributes are not valid, then the method loops back to step 53 to have another attribute entered. If YES, the attributes are valid, then the system adds the entry to the table, step 55. Then the method returns to step 35 to show the user the current table. After the user is through modifying the table, the configuration process stops.

Referring now to FIG. 4, the invocation process will be described. The invocation process is started and initialized, step 61. In step 63, the distribution is ready for some destination, such as filing, sending or receiving the distribution. The system checks and identifies the variety or types of media contained in the distribution, step 65. Then, the system checks the relationships between objects in the distribution, step 66. Next, the method determines if the media types in the distribution are contained in the table of media and assigned attributes, step 67. If YES, then the method proceeds to step 68 where the method determines if there is a conflict in attribute assignments. A conflict could develop, for example, if a user manually assigns an attribute value to a distribution and this manually assigned attribute value conflicts with an attribute value listed in the table of medias and assigned attributes that was configured as shown in FIGS. 2–3. If the result of step 68 is YES, there is a conflict, the user is informed, step 69. Then, the user resolves the conflict, by choosing one of the attributes, step 70. The method proceeds to step 71. If the result of step 68 is NO, the method proceeds to step 71. In step 71, the method assigns attribute types and values to the distribution that correspond to the type of media contained in the distribution, in accordance with the table. Then the method allows the distribution to continue on to its destination, step 72. Finally, the method stops, step 73.

If the result of step 67 is NO, the media in the distribution are not found in the attribute table, then the method bypasses steps 68–71 and goes to step 72 wherein the distribution continues the process of making its way to its destination.

To illustrate the method of the present invention, suppose that all distributions containing audio components are to be classified as PRIVATE—AUDIO CONTENT. This information is entered into the table of medias and assigned classifications using the configuration process of FIGS. 2 and 3. The information can be entered by a user to classify incoming and outgoing distributions to and from his user interface. In addition, the information can be entered by the organization or company operating the data processing system so as to classify all distributions on the system network.

After the information has been entered to configure or reconfigure the system, then the assigning process of FIG. 4 can be invoked. When a distribution is ready for some destination, the method automatically searches the distribution to identify the relationships between objects and the types of media contained in the distribution objects that are contained within the defined relationship. If no audio component is found, then the distribution is sent on its way. If, however, an audio component is found, then the distribution is classified as PRIVATE—AUDIO CONTENT. This notifies the recipient of the distribution that there is audio information which the recipient may not wish to be heard publicly. The recipient can take whatever action is necessary to ensure privacy, such as wearing earphones, closing his office door, etc.

When the invocation method of FIG. 4 assigns an attribute, it can add an attribute value to a distribution with no previous attributes, change an existing attribute on the distribution, or provide an addendum attribute to supplement any existing attributes already on the distribution.

The present invention can be invoked in a variety of ways. As already mentioned, the present invention can be invoked when a distribution is ready for some destination such as being filed, being sent or being received. In addition, the present invention can be invoked at gateway servers 21 (see FIG. 1). When the present invention is implemented at a gateway server 21, then all incoming and outgoing distributions will be assigned attributes according to the requirements of the organization operating the first site. The present invention can be invoked when a distribution is either inbound to or outbound from a predetermined destination such as an individual computer 15 or a Local Area Network 3.

Although the present invention has been described as assigning attributes to distributions based on the presence of specified types of media, the present invention can also assign attributes based on the absence of specified types of media. In addition, the present invention can refrain from assigning attributes, or assign a null attribute, to a distribution if that distribution contains a specific type of media. For example, if a distribution contains a bit image document, then the distribution is not sent as URGENT.

The foregoing disclosure and the showings made in the drawings are merely illustrative of the principles of this invention and are not to be interpreted in a limiting sense.

We claim:

1. A method of automatically assigning attributes to multimedia distributions in a data processing system, each of said multimedia distributions having a plurality of objects, each of said objects with a specific media type, comprising the steps of:

associating specific attributes to specific types of media respectively;

automatically determining the media type of each one of said objects in said multimedia distributions for those objects being within a predetermined relationship; and if said media type has an associated attribute, automatically assigning said associated attribute to said each object; otherwise automatically assigning a null attribute thereto.

2. The method of claim 1 wherein said step of assigning said associated attribute further comprises the step of indicating the content of said respective distributions.

3. The method of claim 1 wherein said step of assigning said associated attribute occurs when said distributions are inbound to a predetermined location.

4. The method of claim 1 wherein said step of assigning said associated attribute occurs when said distributions are outbound to a predetermined location.

5. The method of claim 1 wherein said step of assigning said associated attribute occur when said distributions pass through gateway means.

6. The method of claim 1 wherein said step of assigning said associated attribute to said distributions further comprises the step of associating said associated attribute to said types of media that are present in said respective distributions.

7. The method of claim 1 wherein said step of assigning said associated attribute to said distributions further comprises the step of associating said associated attribute to said type of media that are absent from said respective distributions.

8. The method of claim further comprising the steps of:
   a) determining if there is a conflict in assigning said associated attribute to each of said respective distributions; and
   b) allowing a user to modify said attribute assignment to said respective distributions if there is a conflict.

9. A computer program product for automatically assigning attributes to multimedia distributions in a data processing system, each of said multimedia distributions having a plurality of objects, each of said objects with a specific media type, the program product comprising:

a recording medium readable by the data processing system;

means recorded on said recording medium for associating specific attributes to specific types of media respectively;

means recorded on said recording medium for automatically determining the media type of each one of said objects in said multimedia distributions for those objects being within a predetermined relationship; and means recorded on said recording medium for automatically assigning said associated attribute to said each object if said media type has an associated attribute; otherwise automatically assigning a null attribute thereto.

10. The computer program of claim 9 wherein said assigned attributes indicate the content of said respective distributions.

11. The computer program program of claim 9 wherein said means recorded on said recording medium for assigning makes an assignment of said associated attributes when said distributions are inbound to a predetermined location.

12. The computer program product of claim 9 wherein said means recorded on said recording medium for assigning makes an assignment of said associated attributes when said distributions are outbound to a predetermined location.

13. The computer program product of claim 9 wherein said means recorded on said recording medium for assigning makes an assignment of said associated attributes when said distributions pass through gateway means.

14. The computer program product of claim 9 wherein said means recorded on said recording medium for assigning makes an assignment of said associated attributes if said specific types of media are present in said respective distributions.

15. The computer program product of claim 9 wherein said means recorded on said recording medium for assigning makes an assignment of said associated attributes if said specific types of media are absent from said respective distributions.

16. The computer program product of claim 9 further comprising:
   a) means recorded on said recording medium for determining if there is a conflict in assigning said associated attribute to each of said respective distributions; and
   b) means recorded on said recording medium for allowing user to modify said attribute assignment to said respective distributions if there is a conflict.

17. A data processing system for automatically assigning attributes to multimedia distributions, each of said multimedia distributions having a plurality of objects, each of said objects with a specific media type, said data processing system comprising:
   means for associating specific attributes to specific types of media respectively;
   means for automatically determining the media type of each one of said objects in said multimedia distributions for those objects being within a predetermined relationship; and
   means for automatically assigning said associated attribute to said each object if said media type has an associated attribute; otherwise automatically assigning a null attribute thereto.

18. The data processing system of claim 17 wherein said assigned associated attribute provide an indication of the content of said respective distributions.

19. The data processing system of claim 17 wherein said means for assigning makes an assignment of said associated associated attribute when said distributions are inbound to a predetermined location.

20. The data processing system of claim 17 wherein said means for assigning makes an assignment on said associated associated attribute when said distributions are outbound to a predetermined location.

21. The data processing system of claim 17 wherein said means for assigning makes an assignment of said associated associated attributes when said distributions pass through gateway means.

22. The data processing system of claim 17 wherein said means for assigning makes a assignment of said associated associated attribute if said specific types of media are present in said respective distributions.

23. The data processing system of claim 17 wherein said means for assigning makes an assignment of said associated associated attributes if said specific types of media are absent from said respective distributions.

24. The data processing system of claim 17 further comprising:
   a) means for determining if there is a conflict in assigning said associated attribute to each of said respective distributions; and
   b) means for allowing a user to modify said attribute assignment to said respective distributions if there is a conflict.

* * * * *